July 12, 1932.  E. V. HILL  1,866,650
AIR TREATING APPARATUS
Filed Aug. 6, 1931
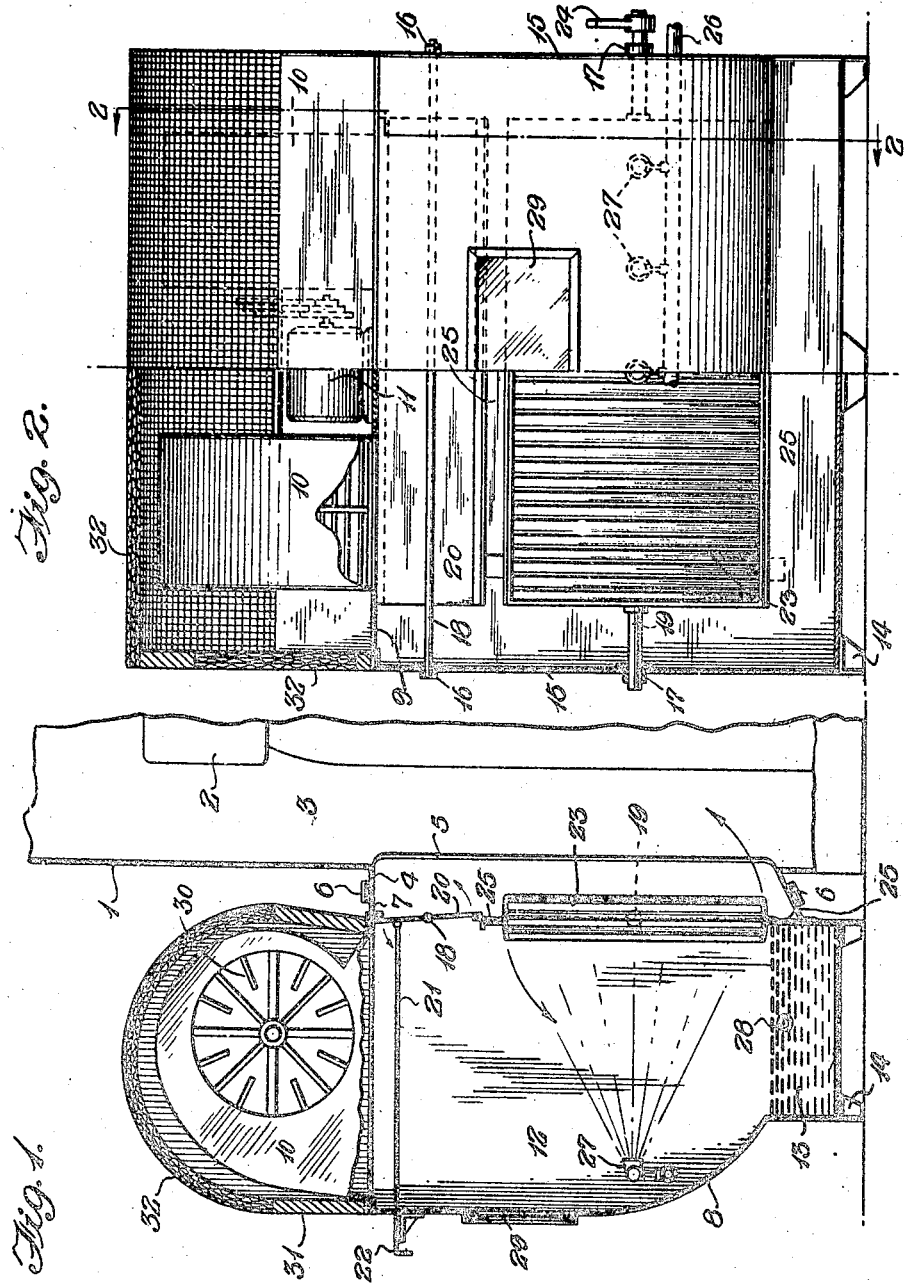
Inventor
E. VERNON HILL.
By Albert Grobstein
Attorney Patented July 12, 1932

1,866,650

UNITED STATES PATENT OFFICE

EARL VERNON HILL, OF CHICAGO, ILLINOIS

AIR TREATING APPARATUS

Application filed August 6, 1931. Serial No. 555,584.

This invention relates to an air cleaning and washing apparatus, adapted for use in the home. More specifically, the invention relates to an air conditioning apparatus to be used in homes, dwellings or the like and comprises in combination with a furnace, means for filtering, cleaning and washing the air.

The invention further relates to a device for humidifying or dehumidifying the air, in combination with a furnace, whereby the discharge and return openings of the furnace are utilized to provide ducts for the air conditioning means.

An important object of the invention is to provide a simple and efficient air washing and cleaning device in combination with a warm air furnace, so that clean and properly heated or cooled air may be distributed to a home or dwelling through the usual furnace distributing passages.

Another object of the invention is to provide a unitary, compact, air washing unit.

It is also an object of the invention to provide a housing adapted to communicate with a furnace casing, which housing includes therein means for filtering air, means for washing air, means for removing dust and dirt from said washed air, means for forcing said air through said cleaning means, and means for by-passing a portion of such air around the washing means.

Another object of the invention is to provide an air cleaning and washing unit which utilizes the return inlet of a warm air furnace as a mixing chamber.

It is also an object of the invention to provide eliminator means for detraining moisture and depositing dust from the air, said eliminator means being reversible so as to expose alternate opposed surfaces to a water spray in conjunction therewith.

It is a further object of the invention to provide a fan or blower means in combination with the return inlet of a warm air furnace, and an air washing chamber below said fan means and in the path of incoming air, and means for bypassing a portion of said air from said fan means into the furnace casing.

It is also an object of the invention to provide a guard or housing for the fan and motor means, such housing serving as a cover, guard, and also as a filter for air entering said fan and motor.

Another object of the invention includes means for spraying water into an air washing chamber in combination with reversible eliminator means, together with or without means for bypassing a portion of the air around the washing eliminator means.

Other objects of the invention include the various agencies herein described for providing an inclosure in which people congregate wherein the air may be washed, filtered, cleaned, cooled, heated, humidified, or dehumidified, in accordance with any condition desired. This includes heating and humidifying clean air in the winter time and distributing the same to all rooms in a manner similar to the present air furnace distribution system, and also includes cooling or even dehumidifying air in the summer time without heating the same to provide a circulation of cool, clean, washed air through the furnace distribution passages, if desired. It is to be understood that any automatic means for regulating the various agencies herein described may be used. An embodiment of my invention is herein shown and described, but variations may be made without departing from the spirit and scope of my invention as set forth within the hereinafter appended claims.

Referring to the drawing, Fig. 1 is a view in sectional elevation along the line 2—2 of Fig. 2, showing also the provision of the inlet of an air furnace as a mixing chamber for the air cleaning device.

Fig. 2 is a rear elevation of the cleaning unit, partly in section and showing various details of the apparatus.

Referring to the drawing, the warm air furnace having an outer casing 1 and fire pot casing 2 defining a chamber 3 therebetween is provided with an inlet conduit 4 defining an inlet opening 5. A packed gasket connection 6 joins the outlet conduit 7 of the air cleaning housing 8 with the inlet conduit 4 of the furnace. The housing 8 has at its top portion thereof a plate 9 supporting the fan casing 10 and motor 11. The plate 9 is provided with openings permitting air to be delivered from the fans into the chamber 12. The housing 8 is provided with a base portion defining a water reservoir 13, the whole being supported upon suitable standards 14. The side plates 15 of the housing 8 are provided with openings having suitable bearings 16 and 17 therein. These bearings respectively support shafts 18 and 19. Shaft 18 carries a damper member 20 and is rotatable in the bearings 16 upon actuation of the rod 21 having a handle 22 extending through the housing 8. The shaft 19 rotatable in bearings 17 carries an eliminator member 23, rotatable and reversible by actuation of the crank 24. It will be noted that the damper 20 is adapted to engage suitable stops at end of its movement, and the eliminator 23 is also adapted to engage suitable stops 25. Horizontally mounted in the spraying chamber 12 is a conduit 26 having a plurality of spraying nozzles 27 mounted thereon, while the drain conduit 28 is mounted as below shown. The housing 8 has a door 29 of glass or the like for viewing the washing process inside without opening the door. Two centrifugal type fans 30 are suitably mounted in the casings 10 and by any desirable gearing are actuated by the motor 11. The fan casings and the motor 11 are covered by a removable guard 31 having a curvature corresponding to the fan casings. This guard cover is provided with a filter screen or other filtering media 32, and protects the motor from dust and dirt and at the same time cleans all air passing therethrough.

The operation of the device is as follows:

The motor 11 actuates the fan 30 and thus draws in air through the filter screen 32 and forces the same downwardly into the spraying chamber 12. Assuming that the damper 20 is closed as shown, all of the incoming air contacts the water spray issuing horizontally from the spraying nozzles 27. The water spray impinges upon the adjacent side of the eliminator, thus washing the same, and at the same time the spray-treated air passes through the baffles of the eliminator 23 and deposits dust and dirt therein at the back side thereof. The washed and cleaned air flows into the inlet of the furnace casing and passes around the fire pot and up through the distributing passages in the usual manner. When the eliminator 23 becomes dirty on its back side due to the deposit of dust and dirt thereon, a turn of the crank 24 through an angle of 180° brings the back and the near side of the eliminator in reversed positions, so that the dirty portion is now sprayed and has the dirt and dust of the same washed downwardly into the reservoir chamber 13, while the clean side is now the rear.

When the damper 20 is in open position, a portion only of the air forced downwardly by the fans is permitted to bypass the chamber 12 and eliminator 23 and mix with the remaining air which passes through the chamber 12 and through the eliminator 23. This mixing takes place at the inlet of the furnace casing or even in the furnace casing itself. In this way the furnace casing functions as a mixing chamber. The damper 20 can be suitably adjusted so that within limits any desired portion of air may bypass the spraying mechanism, but it will be observed that all of the air cannot be bypassed.

In the winter time the furnace is operated as usual with any type of fuel and the cleaned and moistened air is heated before passing into the rooms above. Of course, the fan can be operated without the use of a water spray, if it is so desired. In the summer time, when the furnace is not heated, the entire apparatus functions as a cooling and air cleaning unit, and if it is desirable, spray water having a temperature below the dew point of the air may be used and thus dehumidify the air passing therethrough. By controlling the area of the opening of the damper 20, any desirable mixture of conditioned air may be readily obtained.

The entire apparatus is adapted to be placed in a basement and to withdraw air from the basement through the filter screen 32. It is preferred to have the basement windows closed, and the room windows in the upper floors also closed, so that the basement in effect is the return air chamber of the air conditioning device. If desired, the filter guard 32 may be removed or dispensed with, and a return air duct may be joined directly to the apparatus from the upper rooms. However, register openings through the floor are entirely satisfactory.

It will be observed that the air washing and cleaning unit herein described may be used as a unit apart from hot air or other furnace. It may also be advisable to provide an auxiliary heating means therewith. However, it is preferred to use this air cleaning and washing unit in combination with a furnace.

The apparatus is adapted to circulate air from a basement or other chamber into any number of adjoining or inter-communicating rooms. For example, the device described has been used to circulate cool clean air into a system comprising fourteen rooms, wherein the basement was used as a return air chamber and the return air was vented into the basement.

It will be noted that by using water having a temperature above the dew point of the air, the air is merely cooled and washed without dehumidification. This will be the usual operation, although if it is desired to dehumidify, refrigerated water can be used to obtain that effect.

By using a filter as a housing for the fan and motor, the air is not only cleaned at its source but the motor is also supplied with filtered air. This also permits the most satisfactory arrangement of having a fan between a filter and washer.

The apparatus described is intended for cleaning and cooling air and for changing its temperature rather than a device for ventilation or circulating air. Of course, the fan and distribution passages of the furnace provide for proper circulation. The bypass damper 20 may be dispensed with, if desired. In that event, the eliminator may be made larger to occupy in addition the space now utilized by the bypass damper, and means providing a curtain effect may be placed in front of the top portion of the eliminator and thus prevent water spray from contacting the entire surface, permitting a portion of the air to be sprayed and pass through the eliminator while another portion is not sprayed and passes through the eliminator, both portions coming together in the mixing chamber.

The water system may be provided with means for re-circulating the same, in the event that such a device is desirable. It may also be provided with a pump to circulate the water, or to elevate the same to a drain above the level of the water reservoir, if such an expedient should be necessary. Float valve means may also be employed.

Those skilled in the art will understand that the water reservoir may have associated therewith thermal coils, either for refrigerating or for heating purposes. The motor 11 may be placed in any other position desired to efficiently operate the fans.

Thermostat and hygrostat means may be utilized to automatically actuate the apparatus of the invention, or any controlling part thereof. Automatic control forms no part of the invention herein described, as various elements may be manually operated.

It will be seen that the apparatus described is adapted to efficiently and simply recirculate the air in a home, and to change the temperature of all or part of it, without the necessity of taking in outside fresh air.

What I claim is:

1. In combination with an air heating chamber having an outer casing provided with an opening at the bottom thereof, a housing defining an air washing chamber having an outlet at the bottom thereof communicating with said heating chamber casing opening, means mounted in the washing chamber for spraying the air, a blower above the washing chamber for directing air at right angles into the spray, and eliminator means mounted in the path of the water spray for separating dust and water from the air.

2. An air cleaning and washing unit comprising a casing defining a spray chamber, blower means associated with the chamber for causing air to pass vertically therethru, means in said chamber for spraying liquid therein, and eliminator means therein for detraining water adapted to be reversed while in position in said casing to present alternately opposed surfaces thereof to the liquid spray in the chamber.

3. An air cleaning and washing unit comprising a casing defining a spray chamber, means in said chamber for spraying liquid therein, eliminator means in said chamber adapted to be reversed to present alternately opposed surfaces thereof to the liquid spray in the chamber and means in said chamber operable to prevent part of the air coming into said chamber from being sprayed.

4. An air cleaning and washing unit comprising a casing defining a spray chamber, fan means associated with the chamber for causing air to pass through the chamber, means in said chamber for spraying liquid therein, eliminator means in said chamber adapted to be reversed to present alternately opposed surfaces thereof to the liquid spray in the chamber, and means in said chamber operable to prevent part of the air coming into said chamber from being sprayed.

5. An air washing and cleaning unit comprising a casing having means dividing it into a plurality of chambers, one of said chambers being at the top of the casing and adapted to contain blowers and a motor for operating the same, another of the chambers being at the bottom of the casing and adapted to contain an air washing device, eliminator means defining a part of the humidifying chamber wall, and damper means defining another part of the wall of the humidifying chamber for bypassing air from the blowers around the eliminator means.

6. An air conditioning unit having a vertical washing chamber, a blower unit superposed over the washing chamber, and guard means defining a cover superposed over said blower unit extending over the top thereof and a substantial distance downwardly along the sides and comprising filtering material including a plurality of screens providing an air maze adapted to filter air entering said blower unit.

7. An air filtering, washing, cleaning and thermal apparatus comprising a casing divided into a plurality of chambers, one of the chambers being at the top of the casing and containing blowers and a motor therefor, air filtering means covering said blowers and motor, a second chamber at the bottom of the casing and containing air washing means, a third chamber adjacent said second chamber and separated therefrom by means comprising an eliminator and a damper, said third chamber defining a furnace having means adapted to heat air and being provided with an air discharge outlet, the arrangement being such that air is drawn through the filter guard by the blowers, passed wholly or partly through the washing chamber, and then passed through the furnace and distributed into the rooms.

8. An air conditioning apparatus comprising a water spray chamber having a downcoming duct with spray means therein, a blower chamber superposed and communicating with said spray chamber, a blower in said blower chamber adapted to blow air downwardly into said spraying chamber, and an eliminator defining an outlet for said water spray chamber and adapted to separate water and dust particles from said air and to be washed by said spraying means and means for bypassing air around the spraying chamber.

9. In combination, an air heating chamber, and air spraying chamber communicating therewith including a downgoing duct having a spray therein, an eliminator located between said spraying chamber and said heating chamber, and power-operated means located above said air spraying chamber for producing a forced circulation of air downwardly into the spray through the spraying chamber and upwardly through said heating chamber.

10. In combination, a hot air furnace, an air spraying chamber communicating therewith, an eliminator located between said spraying chamber and said furnace, a damper located above said eliminator, and power-operated means located above said spraying chamber for producing a forced circulation of air downwardly through the spraying chamber and upwardly through said furnace, said damper being operable to bypass part of the air directly into the furnace.

11. In combination, a heating chamber, a humidifier communicating therewith, power-operated means located above the humidifier, a filter covering said power-operated means, said power-operated means being operable to produce a forced circulation of air drawn through said filter downwardly through said humidifier and upwardly through said heating chamber.

12. An air washing and thermal system comprising a warm air furnace, an air washing chamber communicating therewith including a downgoing duct having a spray therein, an eliminator located between said washing chamber and said furnace, and blower means associated with said washing chamber for producing a forced circulation of air downwardly into the spray through the washing chamber, then through the eliminator, and upwardly through the furnace.

13. An air washing and thermal system comprising a warm air furnace, an air washing chamber communicating therewith, a reversible eliminator reversible while in position therein located between said washing chamber and said furnace, and blower means associated with said washing chamber for producing a forced circulation of air downwardly through the washing chamber, then through the reversible eliminator, and upwardly through the furnace.

14. An air washing and thermal system comprising a warm air furnace, a humidifier comprising a vertical casing communicating therewith, blower means associated with said humidifier, filter means covering said blower means, said blower means being operable to produce a forced circulation of air drawn through said filter into said humidifier and upwardly into said furnace.

15. An air conditioning unit having a casing including means therein for washing and blowing air, filter means located at the inlet of said casing and above said blowing and washing means, and eliminator means for removing water from said air, said eliminator means being located at the outlet of said casing and below said washing and blowing means.

16. An air conditioning unit having a casing including means therein for washing and blowing air, filter means located at the inlet of said casing and above said blowing and washing means, and reversible eliminator means for removing water from said air, said reversible eliminator means being reversible while in position and located at the outlet of said casing and below said washing and blowing means.

17. The structure as set forth in claim 1 having an air filter above the blower for guarding the same.

18. In an air conditioning unit, a vertically disposed casing, a blower unit thereabove, a spray in said casing, said casing having a side outlet, said spray being directed toward said outlet, the blower unit blowing air downwardly into the spray and toward said outlet, and a baffle unit disposed adjacent the outlet.

19. In an air conditioning unit, a vertically disposed casing, blower means at the top portion thereof, a spray in the casing, said casing having a side outlet, said spray being directed toward said outlet, the blower means blowing air downwardly into the spray and toward said outlet, a baffle unit disposed adjacent said outlet, said spray being directed against the baffle unit.

20. In an air conditioning unit, a vertically disposed casing, blower means at the top portion thereof, a spray in the casing, said casing having a side outlet, said spray being directed toward said outlet, the blower means blowing air downwardly into the spray and toward said outlet, a baffle unit disposed adjacent said outlet, said spray being directed against the baffle unit and a thermal chamber into which the air passes from the baffle unit.

In testimony whereof, I hereunto set my hand.

EARL VERNON HILL.